US005324145A

United States Patent [19]

Kleine

[11] Patent Number: 5,324,145

[45] Date of Patent: Jun. 28, 1994

[54] TOOL BIT AND CHUCK FOR USE IN PERCUSSION DRILLING AND CHISELING

[75] Inventor: Christian Kleine, Achim-Uesen, Fed. Rep. of Germany

[73] Assignee: Hilti Aktiengesellschaft, Fürstentum Liechtenstein, Fed. Rep. of Germany

[21] Appl. No.: 995,410

[22] Filed: Dec. 18, 1992

[30] Foreign Application Priority Data

Dec. 18, 1991 [DE] Fed. Rep. of Germany ....... 4141846

[51] Int. Cl.$^5$ .......................... B23B 51/02; B23B 31/22

[52] U.S. Cl. .................................... 408/226; 279/19.3; 408/240

[58] Field of Search .................... 279/19.2, 19.3, 19.4, 279/19.5, 19.6, 75, 905; 408/226, 227, 230, 239 R, 240

[56] References Cited

U.S. PATENT DOCUMENTS

| | | | |
|---|---|---|---|
| 4,107,949 | 8/1978 | Wanner et al. | 279/75 |
| 4,502,824 | 3/1985 | Dohse et al. | 409/234 |
| 4,943,192 | 7/1990 | Lafforgue et al. | 408/226 |
| 5,028,057 | 7/1991 | Wanner | 279/19.3 |
| 5,076,371 | 12/1991 | Obermeier et al. | 408/226 |
| 5,174,698 | 12/1992 | Obermeier | 408/226 |

FOREIGN PATENT DOCUMENTS

| | | | |
|---|---|---|---|
| 3941646 | 6/1991 | Fed. Rep. of Germany | 408/226 |
| 4032739 | 4/1992 | Fed. Rep. of Germany | 408/226 |

*Primary Examiner*—Daniel W. Howell
*Attorney, Agent, or Firm*—Anderson Kill Olick & Oshinsky

[57] ABSTRACT

A shank 11 on a tool bit for percussion drilling or chiseling has at least two rotary entrainment grooves (13, 14, 16), however, they are not arranged in diametrically opposed relation. In addition, the shank has at least one locking groove (12). The rotary entrainment grooves (13, 14, 16) are open at the end face (17) of the shank inserted into the chuck, so that rotary entrainment members in a tool bit chuck can be inserted into the rotary entrainment grooves (13, 14, 16). Locking groove (12) is closed at its end adjacent the end (17) of the tool bit inserted into the chuck, so that a locking member of the chuck can fit into the locking groove to prevent axial displacement of the tool bit out of the chuck. To reduce significantly the wear of the shank and the chuck, the shank has an additional rotary entrainment groove (15) located diametrically opposite the locking groove (12). Further, an additional rotary entrainment member is provided opposite the locking member in the chuck.

6 Claims, 1 Drawing Sheet

TOOL BIT AND CHUCK FOR USE IN PERCUSSION DRILLING AND CHISELING

BACKGROUND OF THE INVENTION

The present invention is directed to tool bit having a shank to be inserted into a chuck of a hand-held tool used in chiseling or chipping and/or drilling and/or percussion drilling. The shank has at least two rotary entrainment grooves not located diametrically opposite one another and the grooves extend to the end of the tool bit shank inserted into the chuck, so that rotary entrainment members in the chuck can engage in the rotary entrainment grooves. At least one locking groove, closed at its end closer to the end of the shank inserted into the chuck, is arranged to receive at least one locking member of the chuck for limiting axial movement of the tool bit.

Tool bits of this type are disclosed in DE-PS 2551125 and DE-PS 3717915. These tool bits are shaped so that they can be introduced into the chuck only in a very specific angular position. Tool bits according to DE-PS 3716915 have two diametrically opposed locking grooves closed at both ends. This arrangement is important, because tool bits in this patent publication must also fit into the tool bit chuck of the most widely sold heavy hammer-drill. In this hammer-drill, the transmission of torque as well as the locking action is provided by the two locking grooves disposed diametrically opposite one another.

In the short time since the introduction of hammer-drills and tool bits according to DE-PS 3716915 the disadvantage has been noted that wear, especially in the two rotary entrainment grooves, both lying between the two locking grooves, is very considerable. Considerable wear also takes place at the corresponding parts of the tool bit chuck. Due to such wear, the locking members and the locking grooves must transmit a considerable part of the torque. Again this leads, however, to premature damage to the tool bit chuck. Tool bit chuck damage not only results in considerable costs to the user, but also involves considerable work delays, since the repairs must be performed in a work shop. In addition, the largest possible working diameter of the drilling tool bit and the hand-held tool is limited in the upward direction, due to this wear susceptibility.

SUMMARY OF THE INVENTION

Therefore, the primary object of the present invention is to provide tool bits with at least two rotary entrainment grooves not disposed diametrically opposite one another, whereby the wear in the tool chuck and the tool bit shank is noticeably reduced and tool bits formed in this manner fit into the most widely used heavy hammer-drills, and, in addition, expand the working range of the hand-held tool and the tool bit. In accordance with the present invention, at least an additional rotary entrainment groove is located in the shank at least approximately diametrically opposite a locking groove. With the use of this additional rotary entrainment groove, wear is noticeably reduced, due to the contact area between the additional rotary entrainment groove and the associated rotary entrainment member which can be greater by a multiple due to the considerably larger axial extent of both compared to only one locking member. The locking member has only 50% of the length of the locking groove for permitting axial movement of tool bits in the tool chuck. This effect is increased, because the required radial mobility of the locking member, especially with increased wear in the tool chuck, positional changes of the locking member occur during use, whereby only a line contact exists between the locking groove and the locking member. On the contrary, a large area contact with the associated rotary entrainment member occurs, particularly in the preferred arrangement of planar flanks in the rotary entrainment groove.

To permit the use of the tool bit of the present invention in the most often purchased heavy hammer-drills, the rotary entrainment groove located opposite the locking groove has a cross-sectional shape involving another feature of the invention and is shaped to receive an additional locking member positioned mirror-inverted with respect to the locking member engaged in the locking groove with both members having the same cross-sectional surface. This cross-sectional configuration can also be circular arc-shaped. Accordingly, the tool bit can be introduced into the hammer-drill without any disadvantages.

Since the full advantages of the invention are effective only in a tool chuck adapted to the tool bit, the invention also includes a tool bit chuck for percussion and/or drilling tool bits with two rotary entrainment members which are not disposed diametrically opposite one another, and are provided for axial insertion into the rotary entrainment grooves of tool bits. The chuck is also provided with at least one locking member arranged for radial insertion into a locking groove of the tool bit.

Another object of the present invention is to arrange the tool chuck so that in cooperation with the tool bit of the invention, wear of the tool bit shank and the tool chuck is significantly reduced and the working range of the hand-held tool and the tool bit is appreciably increased.

In accordance with the present invention, a tool bit chuck is provided where, in addition to the features of the tool bit chuck involved, an additional rotary entrainment member is located at least approximately diametrically opposite to the locking member, and, preferably, has planar flanks.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DETAILED DESCRIPTION OF THE INVENTION

Figure 1:
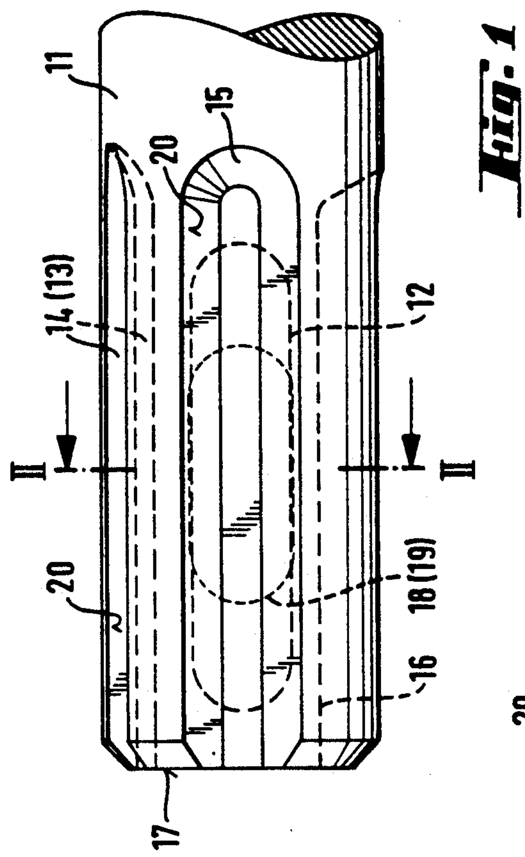
FIG. 1 is an axially extending side view of a portion of a tool bit shank embodying the present invention.
Figure 2:
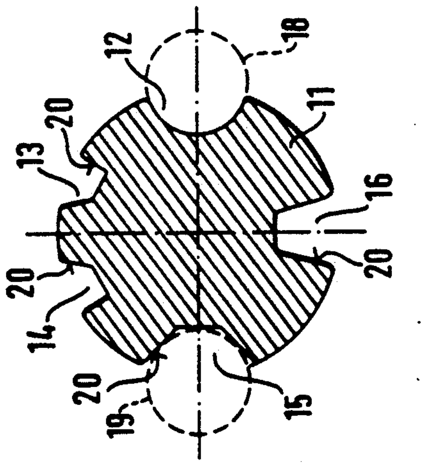
FIG. 2 is a cross-sectional view through the shank illustrated FIG. 1.

A tool bit shank 11 is shown in FIGS. 1 and 2 and the shank has three axially extending rotary entrainment grooves 13, 14, 16 not arranged diametrically opposite one another. In addition, a locking groove 12 is located on one side of the shank and a rotary entrainment groove 15 is located approximately diametrically opposite the locking groove. The rotary entrainment grooves 13, 14, 15, 16 have planar flanks 20 and extend to the end face 17 of the shank 11 which is inserted into a chuck. Locking member 18, shown in dashed lines, engages in the locking groove 14, and another locking member 19 engages in the rotary entrainment groove 15 and is located mirror-inverted to the locking member 18. The locking members 18, 19, shown in broken lines in FIG. 1, indicate the small length of the axial contact area between the tool bit and the locking member.

Figure 3:
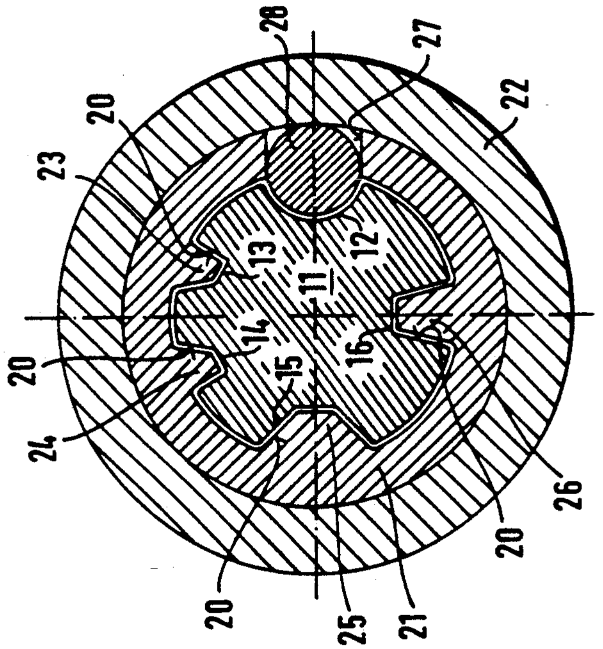
FIG. 3 is cross-sectional view through a tool bit chuck in a hammer-drill shown diagrammatically with the tool bit shank fitted into the tool bit chuck.

FIG. 3 shows in cross-section a tool bit chuck 21 of a hammer-drill. The chuck has rotary entrainment members 23, 24, 25, 26 extending inwardly in an axially extending recess of the chuck. The rotary entrainment members 23, 24, 25, 26 are shaped to fit closely within the rotary entrainment grooves 13, 14, 15, 16 of the tool bit. Locking member 28 is supported in an opening 27 through the chuck and engages into the locking groove 12 of the tool bit. The radially outer surface of the locking member 28 abuts against an inner surface of a locking ring 22 laterally encircling the chuck 21. By manipulating the locking ring 22, the locking member 28 can be released from engagement within the locking groove 12.

The tool bits and tool bit chucks in the invention solve the task of the invention in a surprisingly simple and convincing manner without occurring any additional fabrication costs, as has been demonstrated in tests where the wear has been cut in half. The expenses of fabricating the tool chuck are also reduced, since all rotary entrainment members, including the rotary entrainment member 25, are produced together in a deformation operation and, since only one locking member is used, the expenses for providing the opening 27 and the locking member 28 is only half.

Using only one locking member has no negative effect on the security or the wear of the locking device in the tool bit chuck or the tool bit, as has been demonstrated in tests. The two locking members used in the previously mentioned most often purchased heavy hammer-drill are not required not because of the locking action, rather they are necessary for rotary entrainment, since no separate rotary entrainment members exist in this known type of hammer-drill.

While specific embodiments of the invention have been shown and described in detail to illustrate the inventive principles, it will be understood that the invention may be embodied otherwise without departing from such principles.

I claim:

1. Tool bit comprising an axially extending shank for insertion into a tool bit chuck in a hand-held tool used for chiseling and/or drilling and/or percussion drilling, at least two axially extending rotary entrainment grooves (13, 14, 16) in said shank and disposed out of diametrically opposed relation, said shank has an end (17) to be inserted into said chuck, said rotary entrainment grooves extend to said end of said shank, so that rotary entrainment members of the chuck can be inserted into said rotary entrainment grooves, and at least one axially extending locking groove (12) in said shank and arranged to receive at least a locking member in the chuck, said locking groove (12) is closed at the end thereof closer to said end of said shank for limiting axial movements of the tool bit, wherein the improvement comprises an additional rotary entrainment groove (15) positioned at least approximately diametrically opposite said locking groove (12).

2. Tool bit, as set forth in claim 1, wherein the axial extent of said additional rotary entrainment groove (15) is larger than the axial extent of said locking groove (12).

3. Tool bit, as set forth in claims 1 or 2, wherein said additional rotary entrainment groove (15) has approximately planar flanks.

4. Tool bit, as set forth in claims 1 or 2, wherein said additional rotary entrainment groove (15) has a cross-sectional shape arranged to receive an additional locking member of the chuck.

5. Chuck for a tool bit used for percussion drilling and/or chiseling, said chuck comprises an axially extending recess for receiving the tool bit, said recess has at least two rotary entrainment members (23, 24, 26) not in diametrically opposed relation for introduction into complementary shaped rotary entrainment grooves (13, 14, 16) of the tool bit, at least one locking member (28) for radial introduction into a locking groove (12) of the tool bit, wherein the improvement comprises an additional rotary entrainment member (25) in said recess and located approximately diametrically opposite said locking member (28).

6. Chuck, as set forth in claim 5, wherein said additional rotary entrainment member (25) has approximately planar surfaces.

* * * * *